(12) United States Patent
Park et al.

(10) Patent No.: US 11,969,729 B2
(45) Date of Patent: *Apr. 30, 2024

(54) MICRODEVICE FOR DETECTING ALDEHYDES OR KETONES

(71) Applicant: LG CHEM, LTD.

(72) Inventors: Byung Hyun Park, Daejeon (KR); Byoung Hyoun Kim, Daejeon (KR); Su Youn Han, Daejeon (KR)

(73) Assignee: LG CHEM, LTD., Seoul (KR)

(*) Notice: Subject to any disclaimer, the term of this patent is extended or adjusted under 35 U.S.C. 154(b) by 475 days.

This patent is subject to a terminal disclaimer.

(21) Appl. No.: 17/264,267

(22) PCT Filed: Apr. 16, 2020

(86) PCT No.: PCT/KR2020/005091
§ 371 (c)(1),
(2) Date: Jan. 28, 2021

(87) PCT Pub. No.: WO2020/213953
PCT Pub. Date: Oct. 22, 2020

(65) Prior Publication Data
US 2021/0291166 A1  Sep. 23, 2021

(30) Foreign Application Priority Data

Apr. 19, 2019 (KR) .................. 10-2019-0045791

(51) Int. Cl.
*B01L 3/00* (2006.01)
*G01N 30/92* (2006.01)

(52) U.S. Cl.
CPC ..... *B01L 3/50273* (2013.01); *B01L 3/502723* (2013.01); *B01L 3/502753* (2013.01);
(Continued)

(58) Field of Classification Search
CPC ..... B01L 2200/0652; B01L 2200/0684; B01L 2200/142; B01L 2300/069;
(Continued)

(56) References Cited

U.S. PATENT DOCUMENTS

| | | | |
|---|---|---|---|
| 6,485,687 B1 * | 11/2002 | Spangenberg | G01N 30/95 422/82.11 |
| 2003/0144642 A1 * | 7/2003 | Dopps | A61F 13/53747 604/378 |

(Continued)

FOREIGN PATENT DOCUMENTS

| | | |
|---|---|---|
| CN | 207572483 U | 7/2018 |
| CN | 109954522 A | 7/2019 |

(Continued)

OTHER PUBLICATIONS

NL 8105758 English translation (Year: 2023).*

(Continued)

*Primary Examiner* — Jennifer Wecker
*Assistant Examiner* — Jonathan Bortoli
(74) *Attorney, Agent, or Firm* — Bryan Cave Leighton Paisner LLP

(57) ABSTRACT

A microdevice for detecting aldehydes or ketones by utilizing a rotary platform, the microdevice comprising a disc-shaped rotary platform and a microfluidic structure disposed on the rotary platform, and the microfluidic structure comprising a sample storage part, an eluent storage part, a separation part, a first microfluid flow channel, a second microfluid flow channel, and an absorption pad.

8 Claims, 5 Drawing Sheets

(52) U.S. Cl.
CPC ...... *G01N 30/92* (2013.01); *B01L 2200/0652* (2013.01); *B01L 2200/0684* (2013.01); *B01L 2300/069* (2013.01); *B01L 2300/0803* (2013.01); *B01L 2300/0861* (2013.01); *B01L 2300/0883* (2013.01); *B01L 2400/0406* (2013.01); *B01L 2400/0409* (2013.01)

(58) Field of Classification Search
CPC ..... B01L 2300/0803; B01L 2300/0861; B01L 2300/0883; B01L 2400/0406; B01L 2400/0409; B01L 3/502723; B01L 3/50273; B01L 3/502753; B01L 2300/0806; G01N 2030/903; G01N 30/90; G01N 30/92; G01N 30/93
See application file for complete search history.

(56) References Cited

U.S. PATENT DOCUMENTS

| | | | |
|---|---|---|---|
| 2008/0293151 A1 | 11/2008 | Wada | |
| 2011/0263030 A1 | 10/2011 | Kim | |
| 2012/0028852 A1* | 2/2012 | Lee | B01L 3/502753 506/39 |
| 2012/0328488 A1* | 12/2012 | Puntambekar | B01L 3/5025 422/503 |
| 2015/0065396 A1* | 3/2015 | Kiani | C12N 15/1075 435/6.12 |

FOREIGN PATENT DOCUMENTS

| | | | | |
|---|---|---|---|---|
| EP | 3000531 B1 | 11/2017 | | |
| JP | 1999-101791 A | 4/1999 | | |
| JP | 2007-205867 A | 8/2007 | | |
| JP | 2014-508952 A | 4/2014 | | |
| KR | 10-2014-0148194 A | 12/2014 | | |
| KR | 10-2017-0017687 A | 2/2017 | | |
| KR | 10-1977963 B1 | 5/2019 | | |
| KR | 10-2020-0122606 A | 10/2020 | | |
| NL | 8105758 | * | 7/1983 | ............ G01N 30/90 |
| WO | 2007-105764 A1 | 3/2007 | | |
| WO | WO-2017186063 A1 | * | 11/2017 | ............... B01L 3/00 |
| WO | 2020-004719 A1 | 1/2020 | | |
| WO | 2020-213875 A1 | 10/2020 | | |

OTHER PUBLICATIONS

Burckle et al.("Determination of Formaldehyde in Ambient Air Using Adsorbent Cartridge Followed by High Performance Liquid Chromatography (HPLC)"). Center for Environmental Research Information Office of Research and Development U.S. Environmental Protection Agency Cincinnati, OH 45268 (Year: 1999).*

WO-2017186063 English translation (Year: 2023).*

XP029920701: Park et al., "An integrated rotary microfluidic system with DNA extraction, loop-mediated isothermal amplification, and lateral flow strip based detection for point-of-care pathogen diagnostics," Biosensors and Bioelectronics, Elsevier Science, Ltd. UK, Vo. 91 and Dec. 14, 2016, (pp. 334-340).

XP035392230: Park et al., "Integration of sample pretreatment, mu PCR, and detection for a total genetic analysis microsystem," Mikrochimica Acta, vol. 181, No. 13, Dec. 5, 2013 (pp. 1655-1668).

* cited by examiner

[Fig. 1]
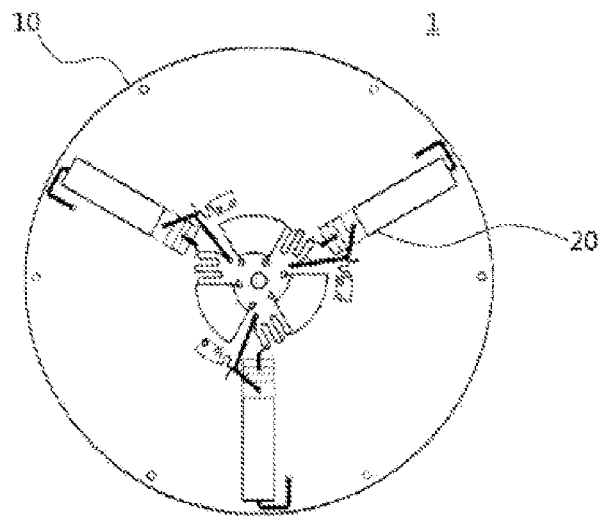
[Fig. 2]
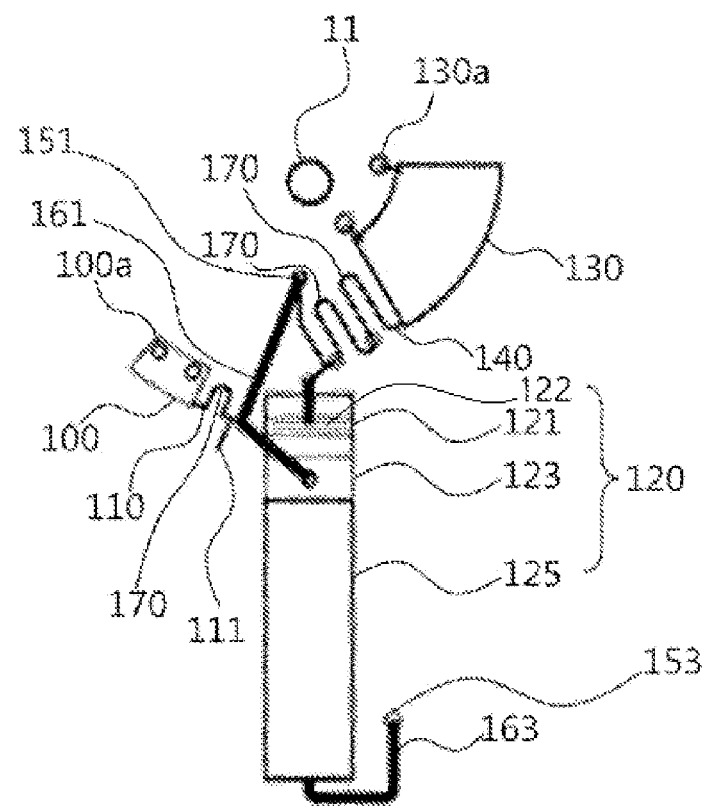

[Fig. 3a]
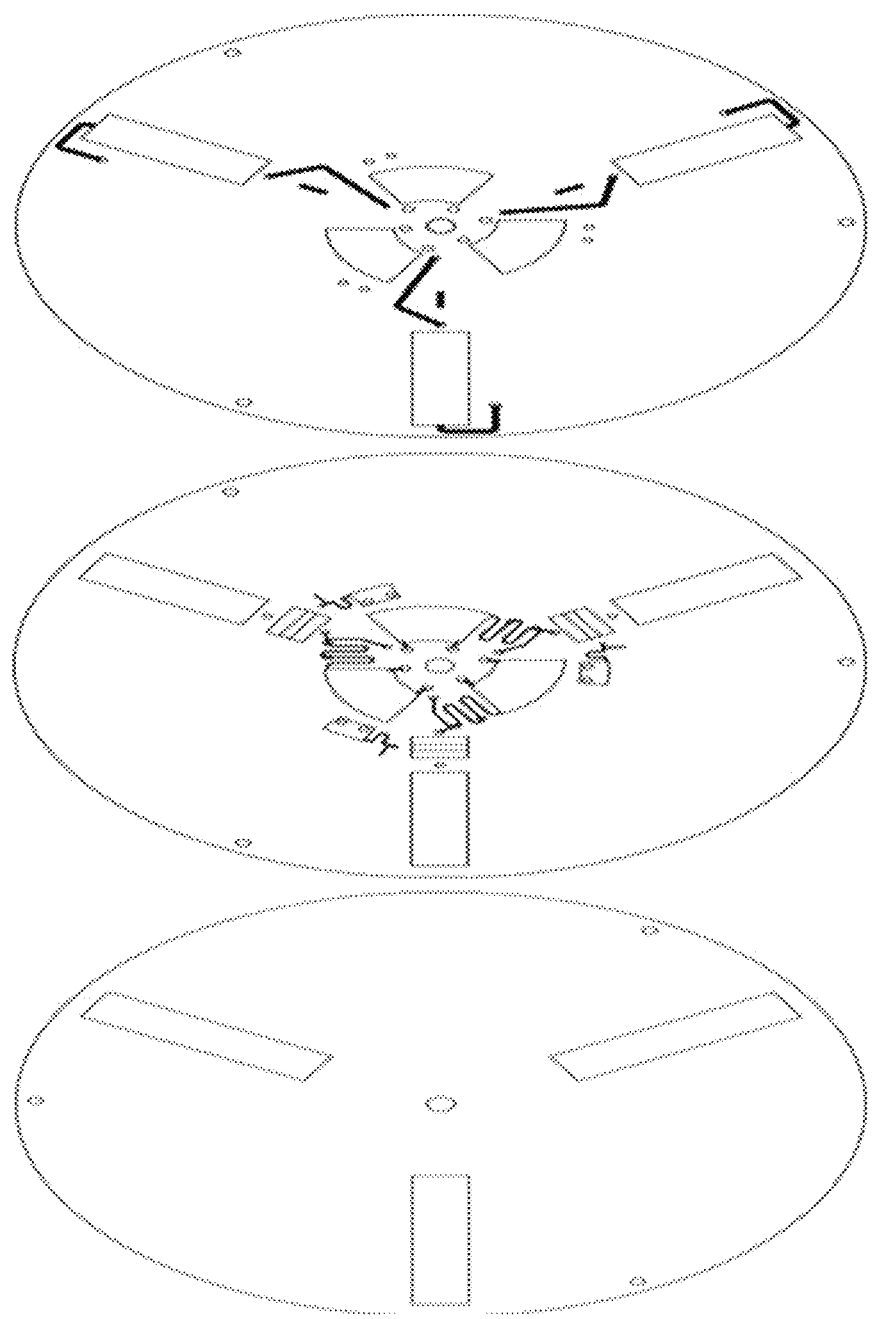

[Fig. 3b]
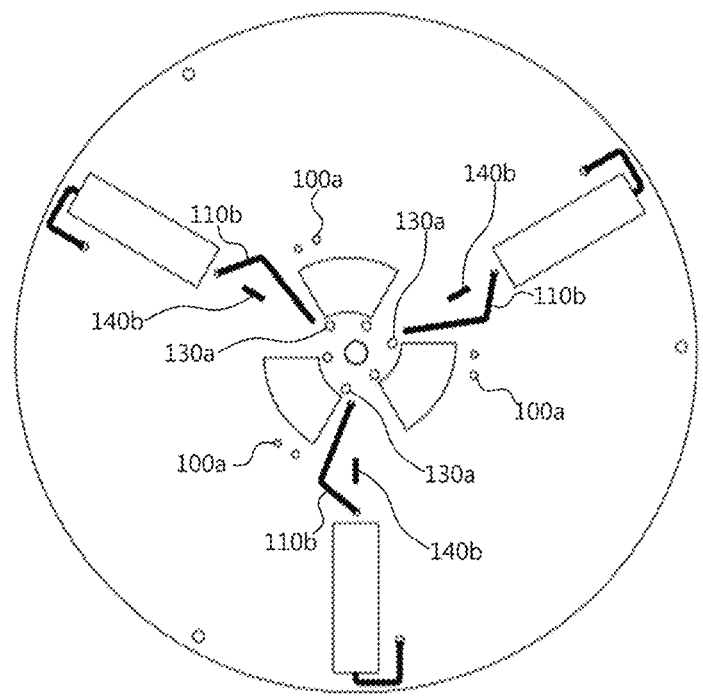
[Fig. 3c]
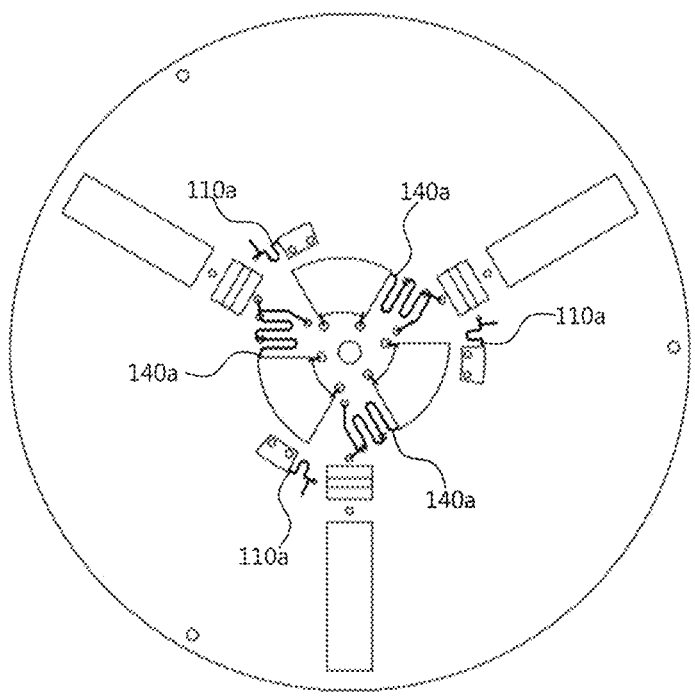

[Fig. 3d]
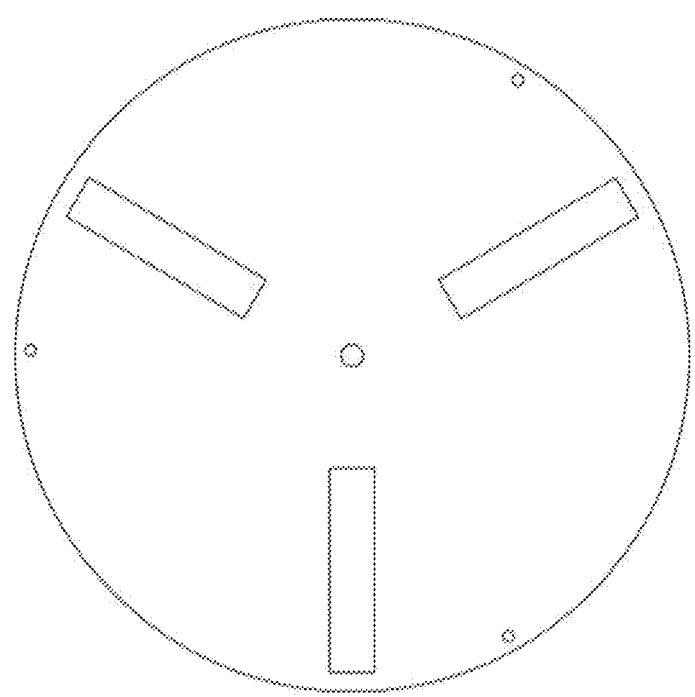
[Fig. 4]
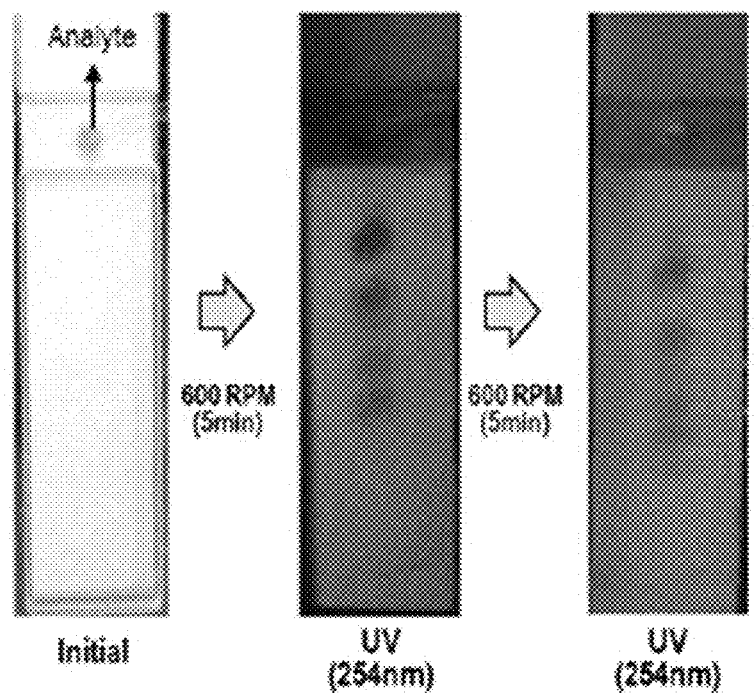

[Fig. 5]
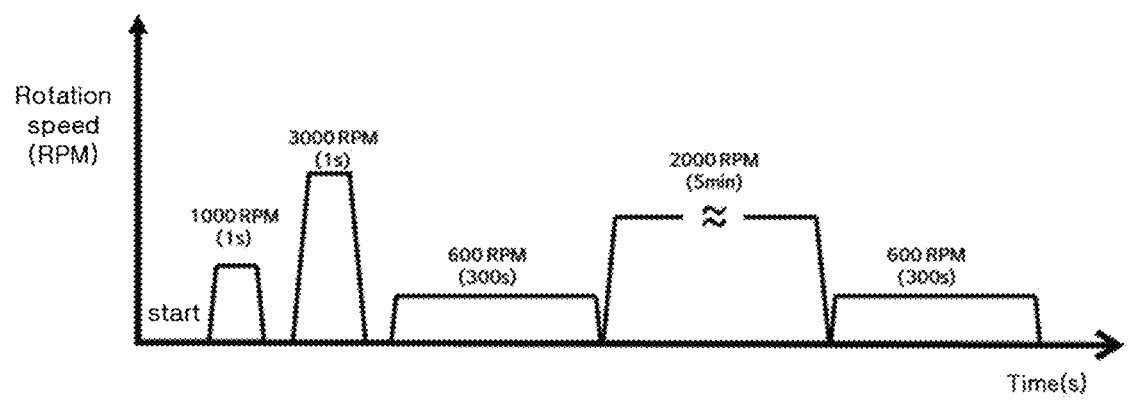
[Fig. 6]
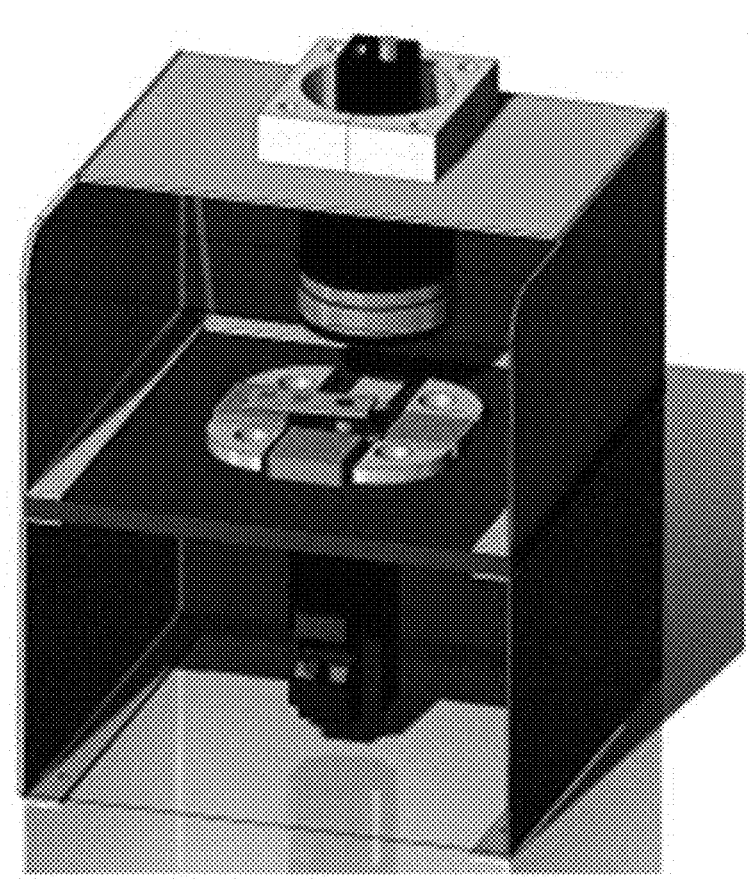

MICRODEVICE FOR DETECTING ALDEHYDES OR KETONES

CROSS-REFERENCE TO RELATED APPLICATION (S)

The present application is a National Stage Application of International Application No. PCT/KR2020/005091, filed on Apr. 16, 2020, which claims priority to Korean Patent Application No. 10-2019-0045791 filed on Apr. 19, 2019, the disclosures of which are incorporated herein by reference in their entireties by reference.

TECHNICAL FIELD

The present disclosure relates to a micro device for detecting aldehydes or ketones, and more specifically, to a micro device for detecting aldehydes or ketones using a rotary platform.

BACKGROUND

A carbonyl compound such as an aldehyde and a ketone is widely used in various fields because of its sterilization and strong reduction action, but is known as a harmful substance which is highly toxic and carcinogenic in humans and animals. Therefore, regulation on the carbonyl compound has been strengthened, and thus, it is required to establish a method for detecting and analyzing the harmful carbonyl compound.

Meanwhile, since the carbonyl compound does not have a chromophore, it cannot be detected with a UV detector. Accordingly, a method mainly used comprises reacting the carbonyl compound of a low molecular weight such as the aldehyde and the ketone which is present in air and water with 2,4-dinitrophenylhydrazine (DNPH) to produce a hydrazone derivative, and then detecting the derivatized compound with a high-performance liquid chromatography (HPLC) (see JP 2010-008311A).

This HPLC method is a representative method for measuring the carbonyl compound, and has the advantage of high sensitivity and selective detection. However, there is a problem in that an expensive commercial DNPH cartridge must be used for derivatization and the operation is complicated.

The Use of a thin layer chromatography (TLC) other than the HPLC causes a problem that a eluent is not uniformly deployed on the TLC because the eluent has to be deployed on the TLC only with a capillary force. In addition, there is a problem in that separation is not easily performed due to a change in a deployment speed by vaporization of the eluent.

Further, since the conventional HPLC or TLC method only allows separation of a mixed sample, a separate device for pre-processing a sample so as to convert the sample into a form suitable for its separation and analysis is required.

SUMMARY

Technical Challenges

The present disclosure is to solve the above problems, and a purpose of the present disclosure is to provide a device for separating and detecting aldehydes or ketones in a more economical and simple manner capable of replacing a HPLC that uses an expensive commercial DNPH cartridge and is operated complicatedly.

Technical Solutions

A device for detecting aldehydes or ketones according to the present disclosure comprises a rotary platform of a disk shape; and a microfluidic structure disposed on the rotary platform, wherein the microfluidic structure may include a sample storage unit into which a fluid sample containing aldehydes or ketones is injected to derivatize the aldehydes or the ketones; an eluent storage unit into which an eluent is injected; a separation unit having a TLC plate that receives the sample and the eluent from the sample storage unit and the eluent storage unit, and separates and deploys the aldehydes or the ketones of the sample with the eluent; a first microfluidic channel (siphon channel) that is a passage through which the sample moves to the separation unit, and connects the sample storage unit and the separation unit; a second microfluidic channel that is a passage through which the eluent moves to the separation unit, and connects the eluent storage unit and the separation unit; and an absorption pad that receives the eluent from the eluent storage unit and discharges it to the TLC plate.

BRIEF DESCRIPTION OF THE DRAWINGS

FIG. 1 shows a detection device according to an embodiment of the present invention.

FIG. 2 shows a microfluidic structure of the detection device of FIG. 1.

FIGS. 3a to 3d show each layer of a rotary platform including a microfluidic structure.

FIG. 4 is photographs showing the results detected by a device for detecting aldehydes or ketones according to the present disclosure.

FIG. 5 is a graph showing a change in a rotation speed over time in a rotary platform.

FIG. 6 shows an analysis system that comprises a detection device according to the present disclosure and is capable of rotating the device.

DETAILED DESCRIPTION

A device for detecting aldehydes or ketones according to the present disclosure may comprises a rotary platform of a disk shape; and a microfluidic structure disposed on the rotary platform, wherein the microfluidic structure includes a sample storage unit into which a fluid sample containing aldehydes or ketones is injected to derivatize the aldehydes or the ketones; an eluent storage unit into which an eluent is injected; a separation unit having a TLC plate that receives the sample and the eluent from the sample storage unit and the eluent storage unit, and separates and deploys the aldehydes or the ketones of the sample with the eluent; a first microfluidic channel (siphon channel) that is a passage through which the sample moves to the separation unit, and connects the sample storage unit and the separation unit; a second microfluidic channel that is a passage through which the eluent moves to the separation unit, and connects the eluent storage unit and the separation unit; and an absorption pad that receives the eluent from the eluent storage unit and discharges it to the TLC plate.

In the device for detecting the aldehydes or the ketones according to the present disclosure, the separation unit includes a sample introduction portion for receiving the sample from the sample storage unit, an eluent introduction portion for receiving the eluent from the eluent storage unit, and a deployment portion in which the aldehydes or the ketones of the sample are separated and deployed with the eluent, and the absorption pad may be provided in the eluent introduction portion.

In the device for detecting the aldehydes or the ketones according to the present disclosure, the center of rotation at which a rotational axis of the rotary platform provided therein is the center of the rotary platform, a longitudinal direction of the separation unit is a radial direction of the rotary platform, and the deployment portion may be formed at a position farther from the center of rotation than the sample introduction portion and the eluent introduction portion.

In the device for detecting the aldehydes or the ketones according to the present disclosure, the rotary platform rotates in a direction perpendicular to a surface of the rotary platform as a direction of the rotational axis. In the separation unit, the TLC plate on which the eluent is deployed by a capillary force is disposed across the deployment portion and the eluent introduction portion such that a longitudinal direction of the TLC plate becomes a direction of a centrifugal force generated by rotation. The eluent is discharged from the eluent introduction portion to the deployment portion, and the eluent in the deployment portion may be propelled by a combined force of the capillary force and the centrifugal force.

In the device for detecting the aldehydes or the ketones according to the present disclosure, one end of the first microfluidic channel may be connected to the sample storage unit and the other end of the first microfluidic channel may be connected to the sample introduction portion. One end of the second microfluidic channel may be connected to the eluent storage unit and the other end of the second microfluidic channel may be connected to the eluent introduction portion.

In the device for detecting the aldehydes or the ketones according to the present disclosure, the absorption pad may be made of a porous adsorption material, for example, a cellulose fiber, a gelatin fiber, a starch fiber or a mixture of two or more thereof.

In the device for detecting the aldehydes or the ketones according to the present disclosure, the aldehydes or the ketones that may be contained in the sample may include at least one selected from the group consisting of acetaldehyde, acetone, acrolein, benzaldehyde, butyraldehyde, formaldehyde, and propionaldehyde.

In the device for detecting the aldehydes or the ketones according to the present disclosure, the inside of the sample storage unit may be filled with 2,4-dinitrophenylhydrazine coated silica (2,4-DNPH-coated silica) in the form of beads.

In the device for detecting the aldehydes or the ketones according to the present disclosure, the microfluidic structure may be provided in plurality, and the plurality of microfluidic structures may accommodate different fluid samples from each other, respectively, and may be disposed radially symmetrically on the rotary platform.

In the device for detecting the aldehydes or the ketones according to the present disclosure, the microfluidic structure further includes a first vent hole and a second vent hole through which an external gas is injected into the separation unit or a gas inside the separation unit is discharged to the external, a first air circulation channel which is a passage through which a gas moves between the first vent hole and the separation unit, and a second air circulation channel which is a passage through which a gas moves between the second vent hole and the separation unit. The first air circulation channel may be connected to one end of the separation unit, and the second air circulation channel may be connected to the other end of the separation unit.

In the device for detecting the aldehydes or the ketones according to the present disclosure, the first microfluidic channel and the second microfluidic channel include a bent portion, respectively, and the number of bent portions of the second microfluidic channel may be more than the number of bent portions of the first microfluidic channel.

In the device for detecting the aldehydes or the ketones according to the present disclosure, the microfluidic structure further includes a waste channel for isolating a part of the sample moving from the sample storage unit to the separation unit, and the waste channel may be a channel branched from the first microfluidic channel.

MODE FOR CARRYING OUT THE INVENTION

Hereinafter, a device for detecting aldehydes or ketones using a rotary disk system according to the present disclosure will be described in detail. The accompanying drawings illustrate exemplary forms of the present disclosure, which are provided to describe the present disclosure in more detail and are not intended to limit the technical scope of the present disclosure.

Hereinafter, preferred embodiments of the present disclosure will be described in detail with reference to the accompanying drawings. The terms or words used in the specification and claims should not be construed to be limited to the ordinary or dictionary meanings, and should be interpreted as meanings and concepts consistent with the technical idea of the present disclosure, based on the principle that the inventor can properly define concepts of the terms in order to best explain his/her own disclosure.

Throughout the specification, in case it is described that a certain portion is "connected" to other portion, this means not only that the portion is "directly connected" to the other portion, but also that another member is interposed therebetween and is "electrically connected" to each other.

Throughout the specification, in case it is described that a certain portion "comprises" or "includes" a certain constitutive element, this means that the portion may further comprise or include other constitutive element without excluding it, unless otherwise stated. In addition, the terms such as " . . . unit", " . . . portion", " . . . group", and "module" described in the specification refer to a unit that processes at least one function or operation.

Further, regardless of the reference numerals, the same or corresponding constitutive elements will be given the same reference numerals and redundant description thereof will be omitted, and, for convenience of description, sizes and shapes of each constitutive member shown may be exaggerated or reduced.

FIG. 1 shows a device 1 for detecting aldehydes or ketones according to an embodiment of the present disclosure, and FIG. 2 shows a microfluidic structure 20 of the rotary disk system of FIG. 1.

First, referring to FIG. 1, the device 1 for detecting aldehydes or ketones comprises a rotary platform 10 and a microfluidic structure 20 provided in the rotary platform 10. The rotary platform 10 may be, for example, a circular disk, and a size thereof may be, for example, 14 cm to 17 cm in diameter.

The rotary platform 10 includes the microfluidic structure 20. The rotary platform 10 may include one microfluidic structure 20 or a plurality of microfluidic structures 20. The plurality of microfluidic structures 20 are radially symmetrically located relative to the center of rotation on the rotary platform 10. The center of rotation may be located at the center of the rotary platform 10, and may be a position of a rotational axis 11 on which the rotary platform 10 rotates. For example, FIG. 1 shows that three microfluidic structures 20 are disposed on a rotary platform 10. Depending on various environments in which the present disclosure is implemented, for example, the sizes of the rotary platform 10 and the plurality of microfluidic structures 20, they may be arranged in three, four, five, six, or more numbers.

The plurality of microfluidic structures 20 in the micro device 1 for detecting aldehydes or ketones according to the present disclosure include a sample storage unit 100 capable of derivatizing the aldehyde or ketone sample, and a separation unit 120, respectively, and the derivative material of the aldehydes or the ketones separated from the separation unit 120 may be qualitatively or quantitatively analyzed through an image analysis.

Referring to FIG. 2, the microfluidic structure 20 may include a sample storage unit 100 into which a fluid sample containing aldehydes or ketones is injected to derivatize the aldehydes or the ketones, an eluent storage unit 130 into which an eluent is injected, a separation unit 120 having a TLC plate that receives the sample and the eluent from the sample storage unit 100 and the eluent storage unit 130, and separates and deploys the aldehydes or the ketones of the sample with the eluent, a first microfluidic channel (siphon channel) 110 that is a passage through which the sample moves to the separation unit 120, and connects the sample storage unit 100 and the separation unit 120, a second microfluidic channel 140 that is a passage through which the eluent moves to the separation unit 120, and connects the eluent storage unit 130 and the separation unit 120, and an absorption pad 122 that receives the eluent from the eluent storage unit 130 and discharges it to the TLC plate.

The microfluidic structure 20 may receive the fluid sample containing a plurality of types of aldehydes or ketones, and separate and detect them. The aldehydes or the ketones that may be contained in the fluid sample may include, for example, at least one selected from the group consisting of acetaldehyde, acetone, acrolein, benzaldehyde, butyraldehyde, formaldehyde, and propionaldehyde.

The sample storage unit 100 includes an inlet 100a having a space that can accommodate the fluid sample containing the aldehydes or the ketones and injecting the fluid sample through the space. The inside of the sample storage unit 100 may be filled with 2,4-DNPH-coated silica in the form of beads. The aldehydes or the ketones do not have a chromophore, and thus, they are first derivatized with the DNPH in the sample storage unit 100 before the fluid sample containing the aldehydes or the ketones moves to the separation unit 120.

The sample storage unit 100 and the separation unit 120 may be connected to the first microfluidic channel 110. In addition, the sample storage unit 100 may include a blocking portion (not shown), and the blocking portion serves to confine the sample to an internal space of the sample storage unit 100 using steps of the channel so as to prevent the sample from flowing into the first microfluidic channel 110 directly when the sample is injected through the inlet 100a. The blocking portion (not shown) is provided with an opening part through which the sample can move from the inlet 100a to an rear end part of the sample storage unit 100. The sample moves from the inlet 100a to the rear end part of the sample storage unit 100 by rotation of the rotary platform 10. In the sample storage units 100, the rear end part of the sample storage unit 100, that is, the vicinity of the place where the sample storage unit 100 and the first microfluidic channel 110 are connected, has, for example, a streamlined shape, so that when the fluid sample injected into the sample storage unit 100 moves to the first microfluidic channel 110, the structural interference is minimized to allow the fluid sample injected into the sample storage unit 100 to move to the first microfluidic channel 110 without any residual amount.

The eluent storage unit 130 includes an inlet 130a having a space that can accommodate the eluent and injecting the eluent into the space. The eluent storage unit 130 and the separation unit 120 may be connected to a second microfluidic channel 140. In addition, the eluent storage unit 130 may include a blocking portion (not shown), and the blocking portion serves to confine the sample to an internal space of the eluent storage unit 130 using the steps of the channel so as to prevent the sample from flowing into the second microfluidic channel 140 directly when the sample is injected through the inlet 130a. The blocking portion (not shown) is provided with an opening part through which the eluent can move from the inlet 130a to an rear end part of the eluent storage unit 100. The eluent moves from the inlet 130a to the rear end part of the eluent storage unit 130 by rotation of the rotary platform 10. In the eluent storage units 130, the rear end part of the eluent storage unit 130, that is, the vicinity of the place where the eluent storage unit 130 and the second microfluidic channel 140 are connected, has, for example, a streamlined shape, so that when the fluid sample injected into the eluent storage unit 130 moves to the second microfluidic channel 140, the structural interference is minimized to allow the fluid sample injected into the eluent storage unit 130 to move to the second microfluidic channel 140 without any residual amount.

The aldehydes or the ketones of the sample are separated and deployed in the separation unit 120, and the separation unit 120 may be provided with the absorption pad 122 and the TLC plate.

The separation unit 120 may include a sample introduction portion 123 for receiving the sample from the sample storage unit 100, an eluent introduction portion 121 for receiving the eluent from the eluent storage unit 130, and a deployment portion 125 for separating and deploying the aldehydes or the ketones of the sample with the eluent.

The separation unit 120 may be formed on the rotary platform 10 such that a longitudinal direction of the separation unit 120 becomes a radial direction of the rotary platform 10. The center of rotation of the rotary platform 10 may be the center of the rotary platform 10. Therefore, when the rotary platform 10 rotates, a centrifugal force can act on the eluent in the separation unit 120 in a movement direction of the eluent. Specifically, the deployment portion 125 may be formed at a position farther from the center of rotation than the sample introduction portion 123 and the eluent introduction portion 121. More specifically, the eluent introduction portion 121, the sample introduction portion 123, and the deployment portion 125 may be arranged in this order, wherein the eluent introduction portion 121 is disposed closest to the center of rotation and the deployment portion 125 is disposed farthest from the center of rotation.

The rotary platform may rotate in a direction perpendicular to a surface of the rotary platform as a direction of the rotational axis 11. In the separation unit 120, the TLC plate on which the eluent is deployed by a capillary force may be disposed across the deployment portion 125 and the eluent introduction portion 121 such that a longitudinal direction of the TLC plate becomes a direction of a centrifugal force generated by rotation.

Accordingly, when the eluent is discharged from the eluent introduction portion 121 to the deployment portion 125, the eluent in the deployment portion 125 may be propelled by a combined force of the capillary force and the centrifugal force. In addition, a strength of the centrifugal force can be controlled by adjusting a rotational speed, and thus, the propulsive force of the eluent can also be controlled by adjusting the rotational speed. Therefore, in the device for detecting aldehydes or ketones according to the present disclosure, when the eluent is deployed on the TLC plate, the capillary force as well as the centrifugal force acts as the propulsive force of the eluent, so that the solvent can be deployed even on the TLC plate uniformly and occurrence of a change in the deployment speed can be prevented by volatilization of the eluent. Specifically, If the fluid is deployed on the TLC plate only by the capillary force, the fluid may volatilize, which makes uniform control of the fluid on the TLC plate difficult. However, in the micro device for detecting aldehydes or ketones according to the present disclosure, the centrifugal force acts together with the capillary force to prevent the deployment error on the TLC plate due to volatilization of the fluid.

The TLC plate may be disposed across the deployment portion 125, the sample introduction portion 123, and the eluent introduction portion 121. The absorption pad 122 is provided at the eluent introduction portion 121 and may be disposed in an overlapped state with the TLC plate. The absorption pad 122 accommodated in the eluent introduction portion 121 may absorb the eluent received from the eluent storage unit 130 and discharge it on the TLC plate uniformly.

The eluent transferred to the eluent introduction portion 121 is absorbed to the absorption pad 122 accommodated inside the eluent introduction portion 121, and the eluent absorbed to the absorption pad 122 can be moved to the separation unit 120 uniformly. That is, the eluent moved from the eluent storage unit 130 to the eluent introduction portion 121 can be absorbed by the absorption pad 122, and then discharged to the deployment portion 125 after passing through the sample introduction portion 123 in an uniform amount and at a constant speed.

As such, in the device 1 for detecting the aldehydes or the ketones according to the present disclosure, since the eluent is first absorbed to the absorption pad 122 and then transferred to the separation unit 120, the eluent can be discharged to the separation unit 120 at the constant speed. That is, the absorption pad 122 can prevent diffusion due to a wettability of the eluent generated when the eluent is injected into the separation unit 120 by a rotating force, and deploy the eluent on the separation unit 120 uniformly.

The absorption pad may be made of a porous adsorbent material, for example, a material of the absorption pad may include a fiber with —OH group similar to the chemical structure of a cellulose. Specifically, the absorption pad may be made of a cellulose fiber, a gelatin fiber, a starch fiber, or a mixture of two or more thereof.

Further, the absorption pad is provided at one end of the TLC plate, and an area of the absorption pad can be appropriately selected depending on an area of the TLC plate. For example, the area may occupy a range of 5 to 10% in an area of the separation unit 120. As an example, in case the separation unit 120 has the area of 5 cm×1 cm, the length×width×height of the absorption pad provided at one end of the separation unit 120 may be 0.5 cm×1 cm×0.14 cm. That is, in case the TLC plate has a length of 5 cm and a width of 1 cm, the absorption pad may be formed with a length of 0.5 cm and a width of 1 cm, which is 10% of the area of the TLC plate. The width of the absorption pad may be greater than or equal to that of the TLC plate. By forming the width of the absorption pad to be greater than or equal to that of the TLC plate, the eluent is first adsorbed to the absorption pad, and then discharged to the deployment portion uniformly. The absorption pad may be a shape of a rectangular parallelepiped, a disc, or the like, but is not limited thereto.

That is, the device for detecting aldehydes or ketones according to the present disclosure can adjust a distributing action between the sample, the fixed phase, and the eluent and improve a resolution by controlling a discharging amount and speed of the eluent through the centrifugal force and the absorption pad.

The TLC plate provided to the separation unit 120 may be coated with a material that can react with the aldehydes or the ketones of the fluid sample, so that the fluid sample can be deployed. The separation unit 120 is provided, for example, with an RP-18 F254s TLC plate, and the TLC plate may be the one that a material having a C18 group bonded to a silica is coated on an aluminum support to a thickness of 0.2 mm. The TLC plate is coated with F254s that can detect fluorescence, and may use water up to 40%. The size of the TLC plate may be 4.5 cm to 5 cm in a length and 0.5 cm to 2 cm in a width. The length of the separation unit 120 may preferably be shorter than two-thirds of the radius of the rotary platform 10. This TLC plate may be applied to the sample of 0.5 μl to 10 μl. The TLC plate is disposed on the separation unit 120, and a longitudinal direction of the TLC plate may also be arranged to be a radial direction of the rotary platform 10.

One end of the first microfluidic channel 110 may be connected to the sample storage unit 100, and the other end of the first microfluidic channel 110 may be connected to the sample introduction portion 123. One end of the second microfluidic channel 140 may be connected to the eluent storage unit 130, and the other end of the second microfluidic channel 140 may be connected to the eluent introduction portion 121.

The other end of the first microfluidic channel 110 may be connected to the sample introduction portion 123 of the separation unit 120. The other end of the first microfluidic channel 110 may be located in the sample introduction portion 123 near the eluent introduction portion 121 such that the sample can be provided from the first microfluidic channel 110 to the sample introduction portion 123 and deployed on the deployment portion 125 by the eluent provided in the eluent introduction portion 121.

The other end of the second microfluidic channel 140 is connected to the eluent introduction portion 121 of the separation unit 120. The eluent is provided from the second microfluidic channel 140 to the eluent introduction portion 121, and the eluent provided to the eluent introduction portion 121 may move to the deployment portion 125 through the sample introduction portion 123. Therefore, the aldehydes or the ketones of the sample in the sample introduction portion 123 may be deployed on the TLC plate by the eluent.

The first microfluidic channel 110 and the second microfluidic channel 140 may each include one or more bent portions. The bent portions may include, for example, a tubular part of a "U" shape. The bent portions may delay movement of the fluid in the microfluidic channels. A number of bent portions 170 of the second microfluidic channel 140 is more than a number of bent portions 170 of the first microfluidic channel 110. This is because the sample must be first introduced into the separation unit 120 through the first microfluidic channel 110, and then be subsequently introduced into the separation unit 120 through the second microfluidic channel 140.

The microfluidic structure 20 may include a first vent hole 151 and a second vent hole 153 through which an external gas is injected into the separation unit 120 or a gas inside the separation unit 120 is discharged to an exterior, a first air circulation channel 161 which is a passage through which the gas moves between the first vent hole 151 and the separation unit 120, and a second air circulation channel 163 which is a passage through which the gas moves between the second vent hole 153 and the separation unit 120. The first air circulation channel 161 may be connected to one end of the separation unit 120, and the second air circulation channel 163 may be connected to the other end of the separation unit 120. Specifically, a connection point between the first air circulation channel 161 and the separation unit 120 is referred to as a first connection point, and a connection point between the second air circulation channel 163 and the separation unit 120 is referred to as a second connection point. In this case, the first connection point may be closer to the center of rotation than the deployment portion 125, and the second connection point may be farther from the center of rotation than the deployment portion 125. That is, the deployment portion 125 may be formed between the first connection point and the second connection point on a virtual line formed by the radial direction of the rotary platform.

The first air circulation channel 161 plays a role to prevent the formation of bubbles due to a pressure in the first microfluidic channel 110 or the second microfluidic channel 140 and move the sample smoothly, by discharging the air trapped in the first microfluidic channel 110 or the second microfluidic channel 140 when the sample is injected into the separation unit 120 by the rotating force.

Further, the second air circulation channel 163 serves to prevent a pressure rise and a moisture condensation inside the separation unit 120 by discharging the air inside the separation unit 120 through the second vent hole 153 when the separation process is performed by the rotating force.

By introducing the first air circulation channel 161 and the second air circulation channel 163, an evaporation rate of the fluid sample and the eluent in the separation unit 120 can be increased while preventing the moisture condensation in the separation unit 120. A backflow of the sample and the eluent to the first air circulation channel 161 and the second air circulation channel 163 can be prevented by drilling holes having a thickness of about 1 mm and a diameter of about 0.8 mm in the first air circulation channel 161 and the second air circulation channel 163 to form a capillary valve caused by an air pressure.

FIGS. 3a to 3d show each layer of a rotary platform 10 comprising the microfluidic structure 20 of FIG. 1. As shown in FIG. 3a, the rotary platform 10 comprising the microfluidic structure 20 can be largely composed of three layers, an upper layer portion (FIG. 3b), a middle layer portion (FIG. 3c), and a lower layer portion (FIG. 3d). Each constitutive element except for the separation unit 120 of the microfluidic structure 20 may be made through a patterning process using a micro milling.

First, referring to FIGS. 3a to 3c, a first part 110a of the first microfluidic channel 110 is arranged on the middle layer portion, and the first part 110a includes a portion connected to the sample storage unit 100 and a bent portion 170. A second part 110b of the first microfluidic channel 110 is arranged on the upper layer portion, and the second part 110b includes a portion connected to the separation unit 120.

According to such an arrangement, the sample is accommodated into the first part 110a of the first microfluidic channel 110 from the sample storage unit 100 disposed on the middle layer portion, and then the sample falls from the top to the downward direction of the separation unit 120, that is, onto the separation unit 120, when the sample is supplied from the first microfluidic channel 110 to the separation unit 120. Therefore, the sample can be deployed on the separation unit 120 more uniformly. If the first microfluidic channel 110 is connected to a side surface of the separation unit 120 to inject the sample, the sample may not be formed as a spot in the injected section, which may cause an error in interpreting the analysis results. In the micro device for detecting aldehydes or ketones according to the present disclosure, the second part 110b connected to the separation unit 120 of the first microfluidic channel 110 is formed on a layer having a different height from the separation unit 120 in the rotary platform 10, so that the sample can be injected to the center of the separation unit 120 from the width direction of the separation unit 120 rather than the side surface of the separation unit 120.

The microfluidic structure 20 may include a waste channel 111 that isolates a part of the sample moving from the sample storage unit 100 to the separation unit 120. The waste channel 111 may be a flow path that is branched from the first microfluidic channel.

By further including the waste channel 111, a part of the sample transferred from the sample storage unit 100 through the first microfluidic channel 110 can flow into the waste channel 111 to isolate the sample as much as the volume of the receiving space inside the waste channel 111 before the sample reaches the separation unit 120. Therefore, the sample of an amount excluding the internal volume of the waste channel 111 may be loaded into the sample introduction portion 123 on the TLC plate. For example, in case the sample having a content of 5 µl is injected into the sample storage unit 100, the volume of the waste channel 111 is designed to be 4.5 µl so that only 0.5 µl of the derivatized sample can be adjusted to be loaded onto the TLC plate. This can prevent a phenomenon that the sample is too excessively loaded on the TLC to perform the separation properly, thereby causing erroneous results.

The DNPH-derivatized fluid sample containing the multiple aldehydes or ketones is injected to the separation unit 120 inserted into the middle layer portion and the lower layer portion of the rotary platform 10 from the first microfluidic channel 110 located in the upper layer portion of the rotary platform 10, that is, is injected to a downward direction. Thus, the fluid sample can be deployed in the separation unit 120 more uniformly.

Further, referring to FIGS. 3a to 3c, the first part 140a of the second microfluidic channel 140 is arranged on the middle layer portion, and the first part 140a includes a portion connected to the eluent storage unit 130 and the bent portion 170. A second part 140b of the second microfluidic channel 140 is arranged over the upper layer portion and the middle layer portion, and the second part 140b includes a portion connected to the separation unit 120. This arrangement is to allow the eluent to be introduced to a lower end center of the separation unit 120. If the second microfluidic channel 140 is connected to a side surface of the separation unit 120 to inject the eluent, the eluent may be deployed as a wave circle without being deployed as a uniform line on the separation unit, whereby it is difficult to perform an uniform separation of the sample. In the micro device for detecting aldehydes or ketones according to the present disclosure, the second part 140b connected to the separation unit 120 of the second microfluidic channel 140 is formed on a layer having a different height from the separation unit 120 in the rotary platform 10, so that the eluent can be injected to the center of the separation unit 120 from the width direction of the separation unit 120 rather than the side surface of the separation unit 120.

Further, as shown in FIG. 3b, the upper layer portion includes an inlet 100a of the sample storage unit 100 and an inlet 130a of the eluent storage unit 130. As shown in FIGS. 3b and 3c, the inlet 100a of the sample storage unit 100 and the inlet 130a of the eluent storage unit 130 are formed over the upper layer portion and the middle layer portion. Therefore, when the sample and the eluent are injected into the inlet 100a of the sample storage unit 100 and the inlet 130a of the eluent storage unit 130 that are provided on the top (that is, the upper layer portion) of the rotary platform 10, respectively, each of the sample and the eluent is accommodated inside the sample storage unit 100 and the eluent storage unit 130 provided in the middle layer portion.

Since most of the constitutive elements described above with reference to FIGS. 1 and 2 are disposed in the middle layer portion, the overlapping explanation of the constitutive elements described in FIGS. 1 and 2 with respect to the middle layer portion will be omitted.

Referring to FIGS. 3c and 3d, the rotary platform 10 is provided with a space that corresponds to the shape of the TLC plate and can accommodate the shape of the TLC plate over the middle layer portion and the lower layer portion, and a space into which the absorption pad provided at one end of the TLC plate can be accommodated. The middle layer portion is opened to allow the TLC plate to be inserted, and the lower layer portion is provided with a concave portion that corresponds to the shape of the TLC plate and into which the TLC plate can be inserted. The TLC plate may be located over the middle layer portion and the lower layer portion. In addition, the eluent introduction portion 121 is formed such that one end of the TLC plate can be inserted over the middle layer portion and the lower layer portion, and the absorption pad may be provided in the eluent introduction portion 121. The present disclosure is not limited to the above descriptions and can be variously modified and changed according to the situation under which the present disclosure is actually implemented, for example, by forming the concave portion that corresponds to the shape of the TLC plate on a bottom surface of the upper layer portion so that the TLC plate can be inserted into the portion where the TLC plate is located in the upper layer portion. Further, a height of the concave portion can also be variously modified and changed according to the situation under which the present disclosure is actually implemented.

A material of the upper layer portion, the middle layer portion and the lower layer portion is preferably made of a cyclic olefin copolymer (COC) that does not react with the aldehydes, and may be made of polycarbonate (PC) or polymethylmethacrylate (PMMA), and the like, depending on the sample.

Meanwhile, an adhesive layer (not shown) may be provided between the upper layer portion, the middle layer portion and the lower layer portion, so that the upper layer portion and the middle layer portion can be bonded, and the middle layer portion and the lower layer portion can be bonded. The adhesive layer may be made of, for example, an acrylic double-sided adhesive tape. The adhesive layer may be manufactured by cutting the sections corresponding to the above-described constitutive elements of each layer portion from a tape or a plate made of a material which has an adhesive component and corresponds to the size of the rotary platform 10.

For example, the sections corresponding to the inlet 100a of the sample storage unit 100 and the inlet 130a of the eluent storage unit 130 may be cut on the adhesive layer for bonding the upper layer portion and the middle layer portion, so that the sample and the eluent injected through the inlet 100a of the sample storage unit 100 and the inlet 130a of the eluent storage unit 130 on the upper layer portion can move to the middle layer, respectively. In addition, as shown in FIG. 3a, the sections corresponding to constitutive elements of the middle layer portion and the lower layer portion may be cut on the adhesive layer for bonding the middle layer portion and the lower layer portion.

In case of using the device for detecting aldehydes or ketones according to the present disclosure as described above, the derivatization and separation of the aldehydes or the ketones can be carried out integrally, and the separation of the aldehydes or the ketones can be performed more quickly and simply.

Specifically, a process for detecting the aldehydes or the ketones using the device of the present disclosure may comprise a derivatization step for derivatizing the aldehydes or the ketones of the fluid sample in the sample storage unit 100, a sample introduction step for moving the fluid sample from the sample storage unit 100 to the sample introduction portion 123 in the separation unit 120, and a deployment step for moving the eluent from the eluent storage unit 130 to the eluent introduction portion 121 in the separation unit 120, and separating and deploying the aldehydes or the ketones of the fluid sample in the deployment portion 125 by the eluent.

Further, after the deployment step, the process may further comprise a drying step for drying the eluent of the deployment portion 125, and a re-deployment step for separating and deploying the aldehydes or the ketones of the fluid sample by re-injecting the eluent into the dried deployment portion 125.

In the derivatization step, the rotary platform 10 may be rotated at 2500 to 5000 RPM for 2 to 20 seconds. The sample can closely contacts with 2,4-DNPH-coated silica in the form of beads by the rotation to accelerate the derivatization reaction of the aldehydes or the ketones with the DNPH. That is, during the rotation, the sample reacts with 2,4-DNPH-coated silica in the form of beads to derivatize the aldehydes or the ketones with the DNPH. In this case, the sample and the eluent can be prevented from being moved to the separation unit 120 during the derivatization of the aldehydes or the ketones of the sample by the bent portion 170 formed in the first microfluidic channel and the second microfluidic channel.

In the sample introduction step, the rotary platform 10 may be rotated at 2000 to 4000 RPM for 0.5 to 2 seconds. For example, the rotary platform 10 in the sample introduction step may rotate at a speed of 3000 RPM for 1 second. The sample can be introduced into the sample introduction portion 123 of the separation unit 120 by the rotation. Since the second microfluidic channel has more bent portions 170 than the first microfluidic channel, during the rotation, the sample is moved from the sample storage unit 100 to the separation unit 120, but the eluent can be prevented from being moved from the eluent storage unit 130 to the separation unit 120.

In the deployment stage, the rotary platform 10 may be rotated at 400 to 800 RPM for 200 to 400 seconds, for example, at 600 RPM for 300 seconds. The eluent can be moved to the eluent introduction portion 121 of the separation unit 120 by the rotation. During the rotation of the rotary platform 10, the eluent can be absorbed primarily to the absorption pad accommodated in the eluent introduction portion 121, and then uniformly discharged at a constant speed to the deployment portion 125 through the sample introduction portion 123. The rotational speed in the deployment step can be controlled to adjust the deployment speed of the eluent on the TLC plate.

In the drying step, the rotary platform 10 may be rotated at 3000 to 5000 RPM for 5 to 6 minutes. An external gas is introduced into the separation unit 120 through the first air circulation channel 161 or the second air circulation channel 163 by the rotation, and the gas introduced into the separation unit 120 is discharged through the first air circulation channel 161 or the second air circulation channel 163 again so that the eluent of the TLC plate can be evaporated.

In the re-deployment step, the rotary platform 10 may be rotated at 400 to 800 RPM for 200 to 400 seconds, for example, at 600 RPM for 300 seconds. In the re-deployment step, the absorption pad may discharge the eluent to the deployment portion 125 again. The rotational speed in the re-deployment step can be controlled to adjust the deployment speed of the eluent on the TLC plate.

The drying step and the re-deployment step may be repeatedly performed, and a resolution of the aldehydes or the ketones separated and deployed on the TLC plate can be enhanced by repeating the drying step and the re-deployment step.

FIG. 4 is photographs showing a TLC plate in which the aldehydes or the ketones are separated and deployed after the derivatization step, the sample introduction step, and the deployment step were performed, and a TLC plate in which the aldehydes or the ketones are separated and deployed after the drying step and re-deployment step were performed after the deployment step. The TLC plate performed up to the derivatization step, the sample introduction step, and the deployment step is the middle TLC plate in the photographs of FIG. 4. The TLC plate in which the drying step and the re-deployment step were further performed after the deployment step is the right TLC plate in the photographs of FIG. 4. Comparing the two TLC plates, it can be seen that the TLC plate in which the drying step and the re-deployment step were further performed after the deployment step has better resolution.

FIG. 5 is a graph showing a rotational speed and a rotation time of the rotary platform 10 while the derivatization step, the sample introduction step, the deployment step, the drying step, and re-deployment step are performed.

FIG. 6 shows a system 2 for detecting the aldehydes or the ketones comprising a device 1 for detecting the aldehydes or the ketones according to the present disclosure. The system 2 for detecting the aldehydes or the ketones further comprises a UV lamp (not shown). The UV lamp may be, for example, installed on a lower surface of the ceiling of the system 2 for detecting the aldehydes or the ketones. However, the present disclosure is not limited thereto. As long as the sample of the aldehydes or the ketones deployed on the separation unit 120 can be identified by illuminating the separation unit 120 with the UV lamp, the positions where the UV lamp can be mounted may be variously modified and changed. As described above, since the aldehydes or the ketones do not have a chromophore, the aldehydes or the ketones can be separated and detected when the aldehydes and the ketones are derivatized with a DNPH in the sample storage unit 100 and then deployed in the separation unit 120, and the separation unit 120 in which the aldehydes or the ketones derivatized with the DNPH were deployed is illuminated with the UV lamp.

As such, the qualitative analysis of a plurality of aldehydes or ketones such as acetaldehyde, acetone, acrolein, benzaldehyde, butyraldehyde, formaldehyde, or propionaldehyde can be performed within few minutes using the detection device 1 according to the present disclosure. Since the seven types of aldehydes or ketones contained in the fluid sample have different degrees of deployment on the separation unit 120, respectively, the seven types of aldehydes or ketones separated and deployed on the separation unit 120 can be detected, respectively, by irradiating the UV lamp to the separation unit 120.

According to the present disclosure, the derivatization of the aldehydes or the ketones with the DNPH and the deployment process on the separation unit 120 are attained through the control of the centrifugal force and the capillary force by controlling rotation of the rotary platform 10 on which the microfluidic structure 20 is disposed.

Further, the detection device 1 according to an embodiment of the present invention makes possible that multiple aldehydes or ketones are separated and detected economically and quickly, and is economical and can shorten the time required for analysis, compared to the conventional expensive HPLC analysis equipment. Further, the detection device 1 can be quickly and conveniently applied in the field where separation and detection of the multiple aldehydes or ketones are required. Moreover, when a plurality of samples are present and these samples contain aldehydes or ketones having different compositions, respectively, the plurality of samples can be analyzed in one device 1 at the same time.

It will be understood by those skilled in the art to which the present disclosure pertains that the above-described technical constitutions of the present disclosure can be implemented in other specific forms without changing the technical idea or essential features of the present disclosure. Therefore, it should be understood that the embodiments described above are illustrative in all respects and not restrictive. Moreover, the scope of the disclosure is indicated by the claims below, rather than the detailed description above. In addition, all modifications or variations derived from the meaning and scope of the claims and their equivalent concepts should be construed as being included in the scope of the present disclosure.

INDUSTRIAL AVAILABILITY

According to the present disclosure, it is possible to provide a compact device that can be conveniently applied in the field while being capable of separating and detecting color-based aldehydes or ketones economically and inexpensively, compared to the expensive HPLC which is the conventional equipment for analyzing the aldehydes or the ketones.

Further, in the device for detecting aldehydes or ketones according to the present disclosure, when the eluent is deployed on the TLC, the capillary force as well as the centrifugal force acts as the propulsive force of the eluent, so that the solvent can be deployed on the TLC uniformly.

Further, in the device for detecting aldehydes or ketones according to the present disclosure, the derivatization reaction process for converting the aldehydes or the ketones into the form that can be analyzed on the TLC, and the separation process for separating the derivatized compound on the TLC can be performed in one device integrally. That is, the device for detecting aldehydes or ketones according to the present disclosure may be the rotary micro device that can integrate the derivatization of the aldehydes or the ketones and the TLC separation.

Furthermore, the present disclosure has an advantage that a plurality of samples containing the aldehydes or the ketones can be separated and detected simply and quickly at the same time.

In particular, a plurality of microfluidic structures provided in the micro device for detecting aldehydes or ketones according to the present disclosure include the sample storage unit capable of derivatizing the aldehyde or ketone samples and the separation unit, respectively, so that the derivatization and the separation of the aldehydes or the ketones can be performed integrally, and the derivative materials of the aldehydes or the ketones separated from the separation unit can be qualitatively or quantitatively analyzed through an image analysis.

Furthermore, the present disclosure has an advantage that a plurality of samples containing the aldehydes or the ketones can be separated and detected simply and quickly at the same time.

Further, in the device for detecting aldehydes or ketones according to the present disclosure, the eluent can be moved at a constant speed as the eluent is first absorbed to the absorption pad provided in the separation unit and then discharged. That is, the absorption pad provided in the separation unit can allow the sample to be stably separated in the separation unit by preventing diffusion due to the wettability of the eluent, which is caused when the eluent is injected into the separation unit in the moving phase by the rotating force, and by moving the eluent at a constant speed.

Further, the device for detecting aldehydes or ketones according to the present disclosure can control a moving speed of the solvent onto the TCL by adjusting the strength of the rotating force, and can improve the resolution of the TLC by drying the solvent remaining on the TLC by rotation after the sample is separated once and repeating the inflow of the eluent and the TLC separation by applying the rotating force again.

What is claimed is:

1. A device for detecting aldehydes or ketones, comprising:
   a rotary platform of a disk shape; and
   a microfluidic structure disposed on the rotary platform, wherein the microfluidic structure includes:
   a sample storage unit into which a fluid sample containing aldehydes or ketones can be injected to derivatize the aldehydes or the ketones;
   an eluent storage unit into which an eluent can be injected;
   a separation unit having a thin layer chromatography plate configured to receive the sample from the sample storage unit and the eluent from the eluent storage unit, to separate the aldehydes or the ketones of the sample and to deploy the aldehydes or the ketones of the sample with the eluent;
   a first microfluidic channel configured to move the sample to the separation unit, and which connects the sample storage unit and the separation unit;
   a second microfluidic channel configured to move the eluent to the separation unit, and which connects the eluent storage unit and the separation unit; and
   an absorption pad configured to receive the eluent from the eluent storage unit and to discharge the eluent to the thin layer chromatography plate, wherein the separation unit includes a sample introduction portion for receiving the sample from the sample storage unit; an eluent introduction portion for receiving the eluent from the eluent storage unit; and
   a deployment portion configured to separate the aldehydes or the ketones of the sample and to deploy the aldehydes or the ketones of the sample with the eluent, and the absorption pad is provided in the eluent introduction portion, wherein the center of rotation at which a rotational axis of the rotary platform provided in the rotary platform is the center of the rotary platform, a longitudinal direction of the separation unit is a radial direction of the rotary platform, and the deployment portion is a position farther from the center of rotation than the sample introduction portion and the eluent introduction portion are from the center of rotation, wherein the rotary platform is configured to rotate in a first direction perpendicular to a surface of the rotary platform in a rotational direction of the rotational axis, the thin layer chromatography plate on which the eluent can be deployed by a capillary force is disposed across the deployment portion and the eluent introduction portion in the separation unit such that a longitudinal direction of the thin layer chromatography plate points in a direction of a centrifugal force generated by a rotation, and the eluent can be discharged from the eluent introduction portion to the deployment portion, and can be propelled in the deployment portion by a combined force of the capillary force and the centrifugal force, wherein the first microfluidic channel comprises one or more first microfluidic bent portions and the second microfluidic channel comprises two or more second microfluidic bent portions and wherein a number of the two or more second microfluidic bent portions of the second microfluidic channel is more than a number of the one or more first microfluidic bent portions of the first microfluidic channel.

2. The device according to claim 1,
wherein a first end of the first microfluidic channel is connected to the sample storage unit and a second end of the first microfluidic channel is connected to the sample introduction portion, and
a first end of the second microfluidic channel is connected to the eluent storage unit and a second end of the second microfluidic channel is connected to the eluent introduction portion.

3. The device according to claim 1,
wherein the absorption pad is made of a cellulose fiber, a gelatin fiber, a starch fiber or a mixture of two or more thereof.

4. The device according to claim 1, wherein the aldehydes or the ketones contained in the sample includes at least one selected from the group consisting of an acetaldehyde, an acetone, an acrolein, a benzaldehyde, a butyraldehyde, a formaldehyde, and a propionaldehyde.

5. The device according to claim 1,
wherein the inside of the sample storage unit is filled with 2,4-dinitrophenylhydrazine coated silica (2, 4-DNPH-coated silica) in the form of beads.

6. The device according to claim 1,
wherein the microfluidic structure is provided in plurality, and the plurality of microfluidic structures are capable of accommodating different fluid samples from each other, respectively, and are disposed radially symmetrically on the rotary platform.

7. The device according to claim 1, wherein the microfluidic structure further includes a first vent hole and a second vent hole through which an external gas can be injected into the separation unit or an internal gas inside the separation unit can be discharged to the external; a first air circulation channel configured to move gas between the first vent hole and the separation unit; and a second air circulation channel configured to move gas between the second vent hole and the separation unit, and wherein the first air circulation channel is connected to one end of the separation unit, and the second air circulation channel is connected to the other end of the separation unit.

8. The device according to claim 1, wherein the microfluidic structure further includes a waste channel for isolating a part of the sample moving from the sample storage unit to the separation unit, and wherein the waste channel branches from the first microfluidic channel.

\* \* \* \* \*